(12) United States Patent
McCarty (10) Patent No.: US 11,419,339 B1
(45) Date of Patent: Aug. 23, 2022

(54) CONTINUOUS FLOW DEBONED POULTRY MEAT APPARATUS AND METHOD

(71) Applicant: Larry Paul McCarty, Van Buren, AR (US)

(72) Inventor: Larry Paul McCarty, Van Buren, AR (US)

( * ) Notice: Subject to any disclaimer, the term of this patent is extended or adjusted under 35 U.S.C. 154(b) by 389 days.

(21) Appl. No.: 16/692,380

(22) Filed: Nov. 22, 2019

(51) Int. Cl.
  *A22C 21/00* (2006.01)
  *B65G 51/04* (2006.01)
(52) U.S. Cl.
  CPC .......... *A22C 21/0053* (2013.01); *B65G 51/04* (2013.01); *B65G 2201/0202* (2013.01)
(58) Field of Classification Search
  CPC .... A22C 21/00; A22C 21/0053; B65G 51/04; B65G 2201/0202
  USPC .......................................... 45/177; 452/177
  See application file for complete search history.

(56) References Cited

U.S. PATENT DOCUMENTS

| 5,731,029 A | 3/1998 | Karwowski et al. ......... 426/646 |
| 9,545,113 B2 | 1/2017 | Spierts et al. |
| 2021/0289798 A1* | 9/2021 | Chancellor .......... A22B 5/0076 |

* cited by examiner

*Primary Examiner* — Richard T Price, Jr.
(74) *Attorney, Agent, or Firm* — Keisling & Pieper PLC; David B. Pieper; Trent C. Keisling (57) ABSTRACT

A deboned poultry meat batch to continuous feed system using a hopper input transferring the meat through a vacuum fill to a low pressure gravity separation small volume batch tank. The low pressure gravity separation small volume batch tank is connected through a rotary valve to a larger lower pressure level-maintenance tank with a tight parameter pressure regulation system to maintain a consistent flow output.

8 Claims, 6 Drawing Sheets

CONTINUOUS FLOW DEBONED POULTRY MEAT APPARATUS AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in meat processing systems. More particularly, the invention relates to improvements particularly suited for deboned poultry meat. In particular, the present invention relates specifically to an automated non-human contact meat processing system for batch input and continuous flow output without product harm.

2. Description of the Known Art

As will be appreciated by those skilled in the art, meat processing systems are known in various forms. Patents disclosing information relevant to meat processing include: U.S. Pat. No. 9,545,113, issued to Spierts, et al. on Jan. 17, 2017 entitled Processing a mass of pumpable foodstuff material. U.S. Pat. No. 5,731,029, issued to Karwowski, et al. on Mar. 24, 1998 entitled Method for making jerky products. Each of these patents is hereby expressly incorporated by reference in their entirety.

The problem with the prior art for poultry processing places a batch of large items such as chicken breasts onto a production line which creates a lump of meat on the conveyor that is then smoothed out by hand with people or using mechanical rollers in an attempt to get a more consistent stream while not destroying the continuity of the cut of meat. This results in several problems including clogs, feed capacity problems and consistency, lumping of the meat, and the added labor costs.

From these prior art references it may be seen that these prior art patents are very limited in their teaching and utilization, and an improved meat handling process is needed to overcome these limitations.

SUMMARY OF THE INVENTION

The present invention is directed to an improved continuous flow deboned poultry apparatus and method. In accordance with one exemplary embodiment of the present invention, a batch supply stage is provided that is flowably connected through a transfer stage to a feed stage for continuously feeding deboned cut poultry meat in a processing line.

The poultry is initially placed in a hopper. A vacuum is then pulled onto a small batch tank and the poultry is then transferred via vacuum into a gravity separating small volume batch tank. Gravity makes the poultry meat fail to the bottom of the tank while a vacuum is pulled on the top of the tank. The vacuum is turned off, the input valve is closed, and the small batch tank is then pressurized to 12 psi to become a high pressure tank in relation to the pressure of a larger feed tank positioned below the small tank. From the smaller higher pressure batch tank, a rotary valve is used to selectively flow the poultry from the 12 psi smaller higher pressure batch tank into a larger lower pressure level-maintenance tank operating at 10 psi. The terms smaller and larger are volume measurements, higher and lower are used for pressure differences in one tank relating to the other tank, and the terms above and below relate to the gravitational pull downward. Because of the small size of the batch tank and the slight pressure difference caused during the meat transfer, the control system can easily keep the larger 10 psi tank within operating parameters. In this manner, the large level-feed tank ensures a constant operating flow at 10 psi for the meat leaving the feed tank. From the feed tank, the 10 psi pressure pushes the meat out a flow tube onto the conveyor without harming the meat product. In this manner, a batch of meat has been turned into a continuous product flow in a sterile environment.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
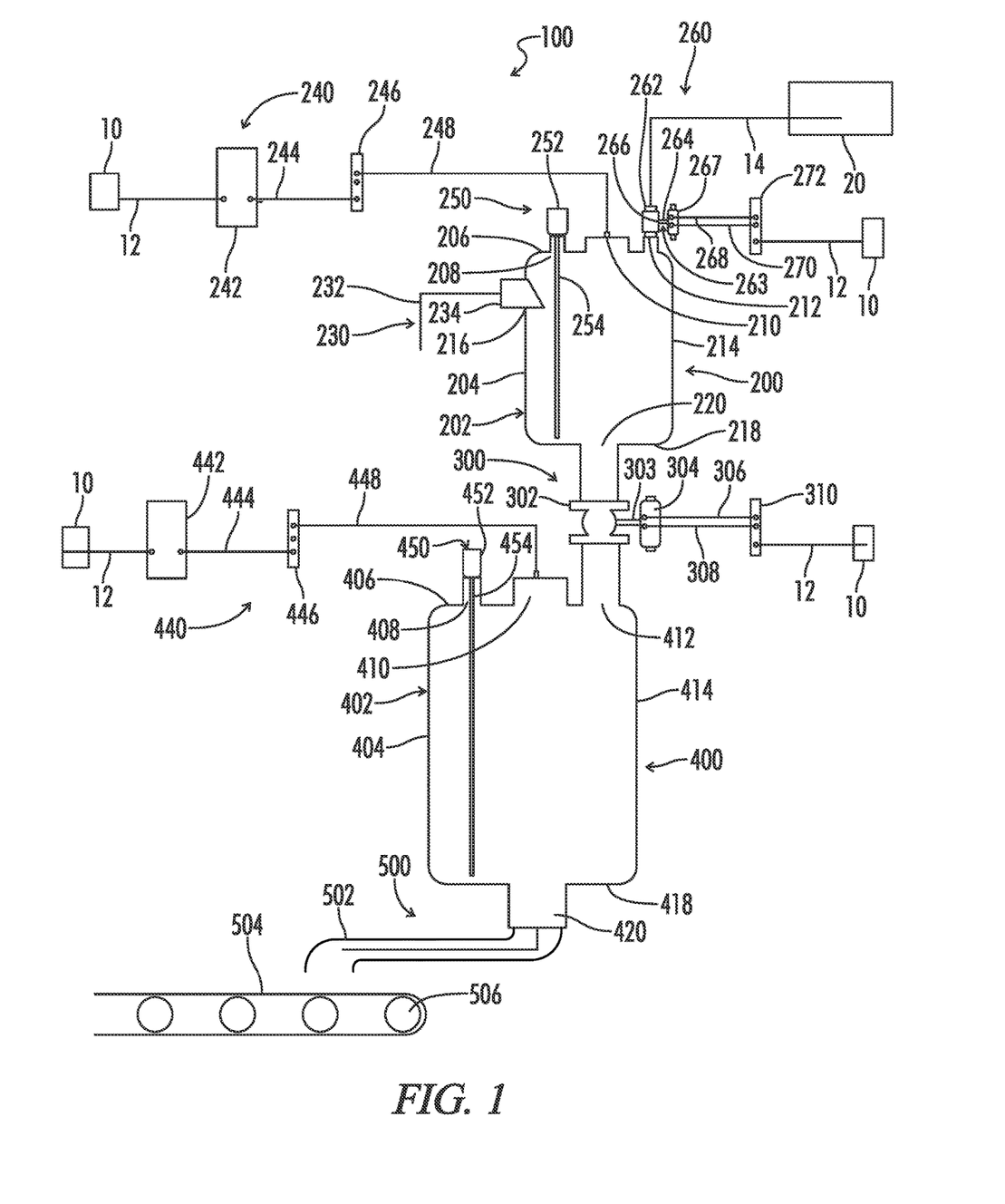
FIG. 1 is a schematic view of a continuous flow deboned poultry apparatus.
Figure 2A:
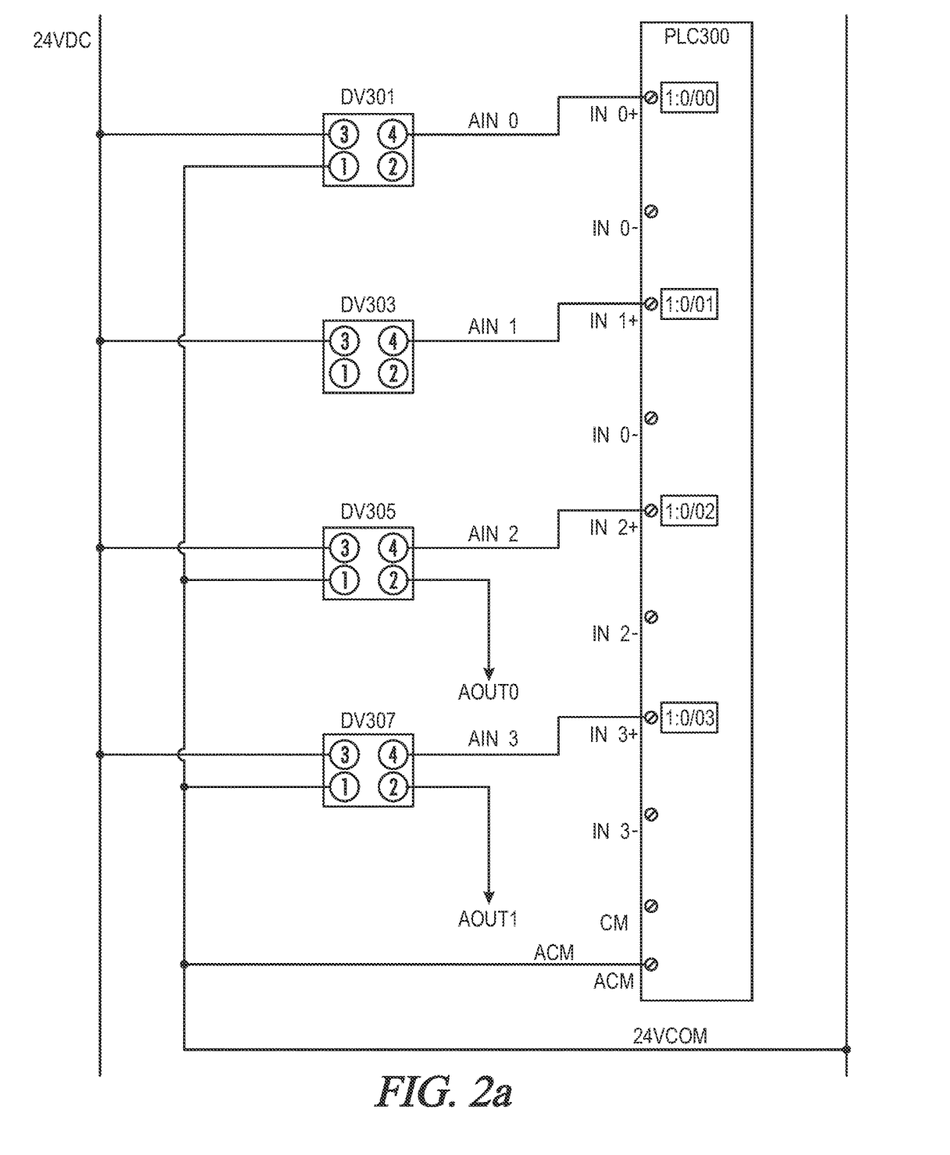
FIG. 2a is a first part of an electrical schematic for the device of FIG. 1.
Figure 2B:
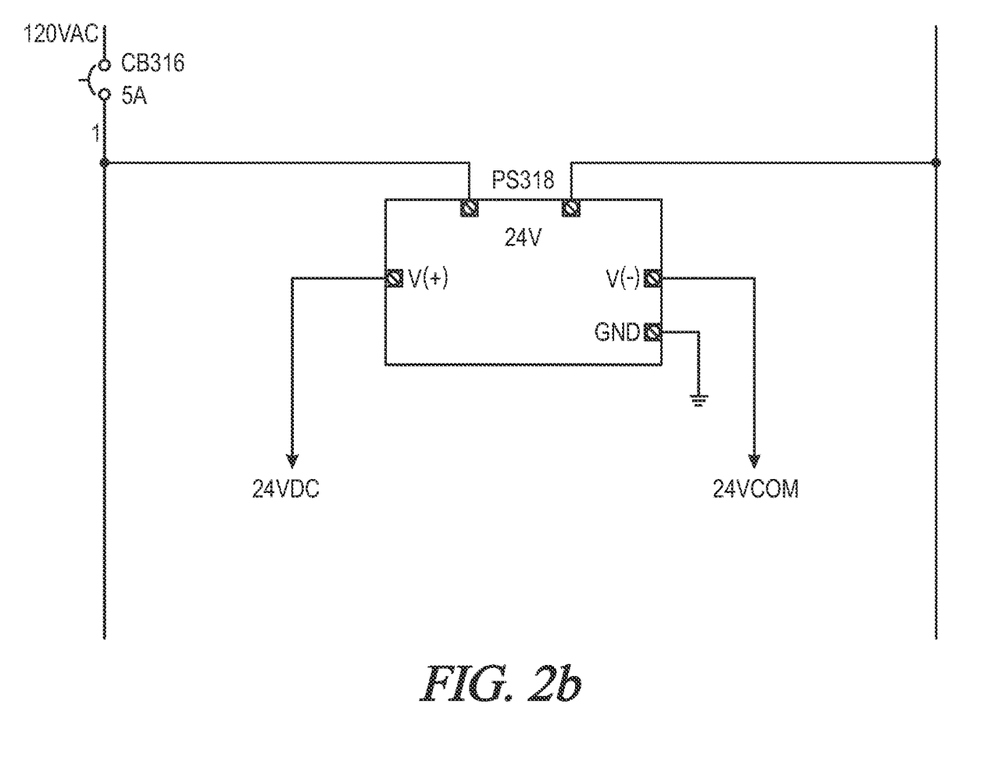
FIG. 2b is a second apart of the electrical schematic for the device of FIG. 1.
Figure 2C:
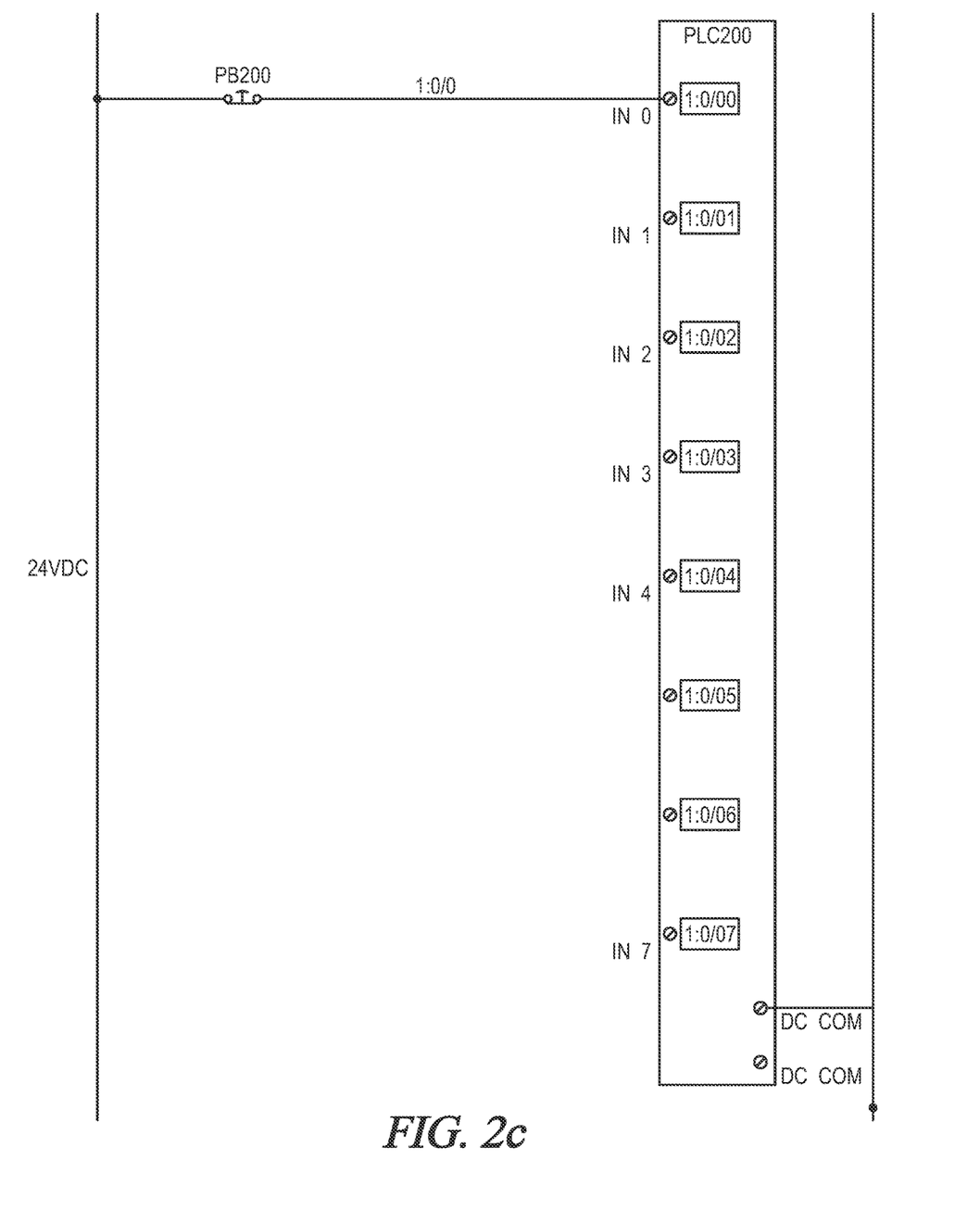
FIG. 2c is a third part of the electrical schematic for the device of FIG. 1.
Figure 2D:
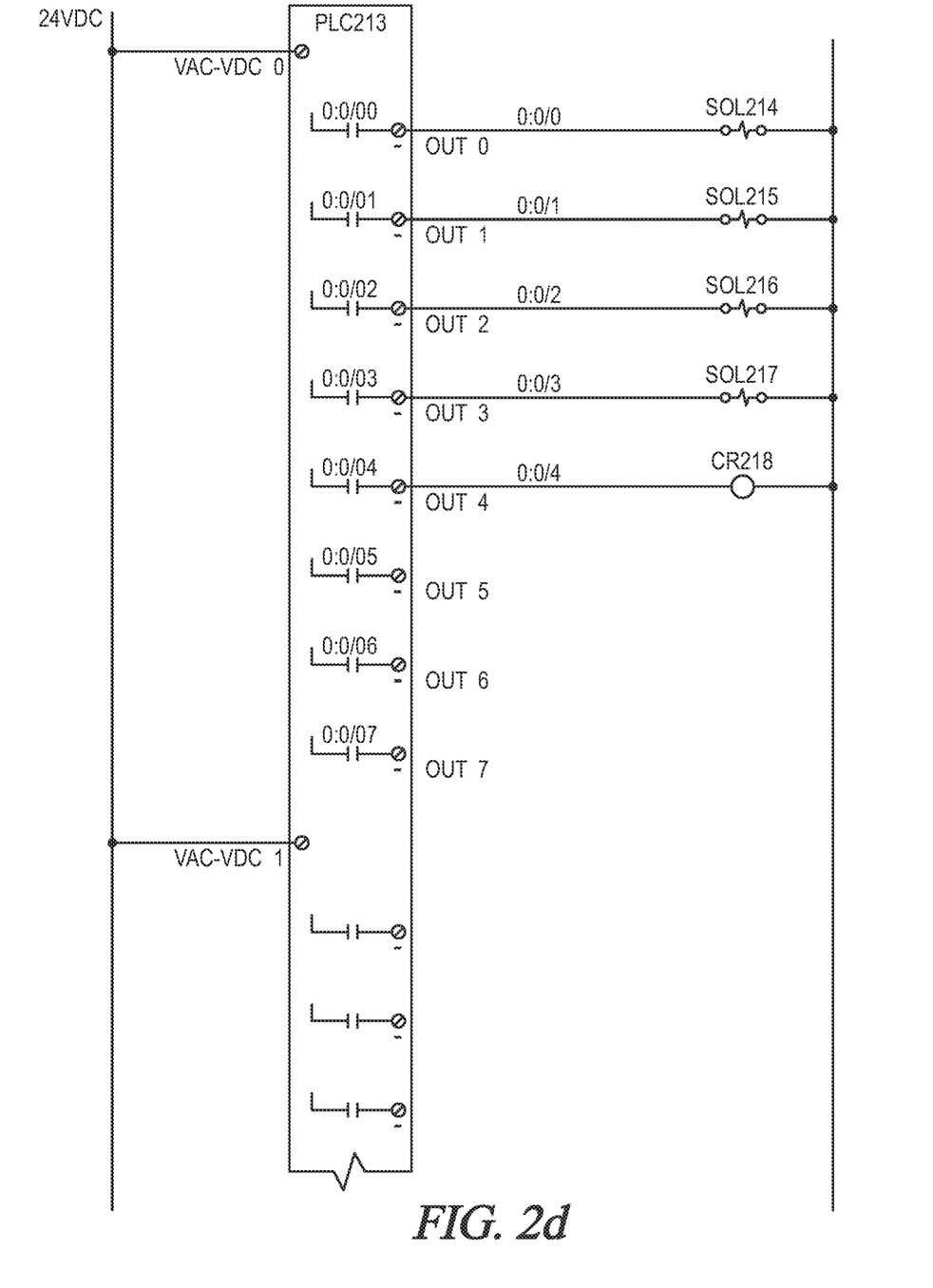
FIG. 2d is a fourth part of the electrical schematic for the device of FIG. 1.
Figure 3:
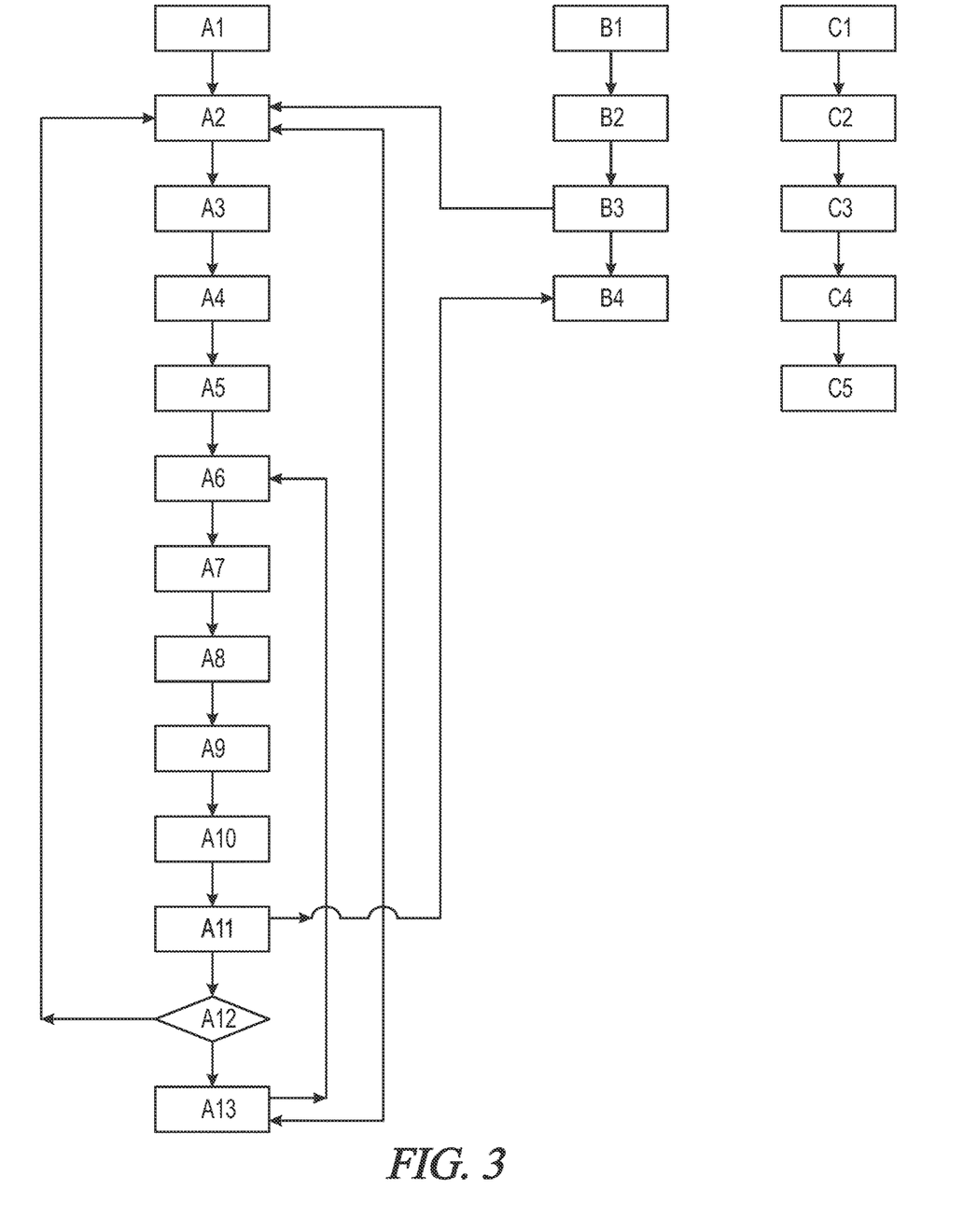
FIG. 3 is a flow chart of the process of the present invention.

As shown in FIGS. 1 through 3 of the drawings, one exemplary embodiment of the present invention is generally shown as a continuous flow poultry meat system 100. Base requirements such as an air supply 10 via an air supply line 12; a vacuum supply 20 via a vacuum line 14; and an electrical supply are needed for the system 100. The continuous flow poultry meat system 100 has multiple stages including a supply stage 200, a transfer stage 300, and a feed sage 400, and a product discharge stage 500.

In the supply stage 200, a gravity separation supply tank 202 is provided with a supply tank body 204. The supply tank body 204 includes a supply tank top 206 defining a supply probe aperture 208; a supply pressure aperture 210; and a supply vacuum aperture 212. The supply tank body 204 also includes a supply tank side wall 214 defining a supply infeed aperture 216, and a supply tank bottom 218 defining a supply output aperture 220. In the preferred embodiment, the separation supply tank 202 is thirty two inches tall with a diameter of twenty four inches. The supply probe aperture 208, supply pressure aperture 210, and supply vacuum aperture 212 are two inch sanitary fittings and the supply infeed aperture 216 and supply output aperture 220 are a six inch sanitary fittings. A six to ten inch conversion flange is connected to the supply output aperture 220.

The product infeed 230 includes an infeed pipe 232 connected by an infeed check valve 234 to the supply infeed aperture 216. The infeed check valve 234 is a SAMSON Model No. 3310-07-A351CF8M six inch stainless flange air actuated ball valve available from SAMSON CONTROLS INC. USA, 4111 Cedar Blvd, Baytown, Tex. 77523.

The supply pressure system 240 uses air supply line 12 to feed a supply tank pressure transducer 242 connected by a supply transducer air line 244 to a supply pressure enable solenoid valve 246. The supply pressure enable solenoid valve 246 is connected by a supply pressurizing line 248 to the supply pressure aperture 210.

The supply level probe system 250 uses a probe body 252 with an extending probe rod 254 the drops into the supply tank body 204 to determine the height of meat in the supply tank body 204. The supply level probe 250 is a KEYENCE Model No. FL-S001 guide pulse type level sensor with a probe length of 23 inches. KEYENCE CORPORATION OF AMERICA, 500 Park Boulevard, Suite 200, Itasca, Ill. 60143, U.S.A.

The vacuum draw system 260 uses the vacuum line 14 through a pneumatic valve 262 connected to the supply vacuum aperture 212. The pneumatic valve 262 is connected through vacuum control lines 263 including a vacuum valve input 264 and vacuum valve output 266 to the pneumatic vacuum actuator 267. The pneumatic vacuum actuator 267 is connected by the first solenoid line 268 and second solenoid line 270 to the vacuum solenoid valve 272 that is connected to the air supply line 12. The pneumatic valve 262 is a VLABIA Model No. 82DA1375 two inch actuated ball valve from VALBIA S.r.l., Via Industriale, 30, 25065 Lumezzane S.S. Italy The transfer stage 300 uses a transfer flow valve 302 connected between the supply output aperture 220 and the feed input aperture 412 on the feed tank 402. The transfer flow valve 302 is connected by transfer control lines 303 to the transfer pneumatic valve actuator 304. The transfer pneumatic valve actuator 304 is connected by the first transfer solenoid line 306 and the second transfer solenoid line 308 to the transfer solenoid valve 310 that is connected to the air supply line 12.

The feed stage 400 includes a feed tank 402 with a feed tank body 404. The feed tank body 404 includes a tank top 406 defining a probe aperture 408, pressure aperture 410, and feed input aperture 412. The feed tank 402 also includes a tank side wall 414 and tank bottom 418 defining a feed output aperture 420. The feed tank 402 is forty six inches tall with a diameter of 36 inches and is mounted on casters for mobility. Note that the feed tank402 is larger than the supply tank 202 so that the feed tank can absorb the material from the supply tank 202 without overfilling, and can also absorb the pressure input moving the meat from the supply tank 202 to the feed tank 402. The feed output aperture 420 is a six inch sanitary fitting.

The feed tank 402 is fed through the feed pressure system 440. The feed pressure system 440 uses the air supply line 12 to feed a feed tank pressure transducer 442 connected by a feed transducer air line 444 to the feed pressure enable solenoid valve 446. The feed pressure enable solenoid valve 446 is connected through the feed pressurizing line 448 to the pressure aperture 410. This maintains the feed tank 402 at a consistent 10 psi.

The feed level probe system 450 uses a probe body 452 mounted to the probe aperture 408 to control the movement of the probe rod 454 to measure the meat level in the feed tank 402. The feed level probe 450 is a KEYENCE Model No. FL-S001 guide pulse type level sensor with a probe length of 40 inches. The prob system 450 provides the knowledge for when to fill the feed tank 402 and when the feed tank 402 gets low on meat.

The product discharge stage 500 uses a discharge line 502 connected to the feed output aperture 420 to provide meat onto a conveyor belt 504 operated by a conveyor drive 506.

FIG. 2 shows the electrical schematic for the system 100. The electrical panel is a SAGINAW CONTROL AND ENGINEERING Model No. SCE-20EL2010SSLP measuring 20 inches by 20 inches by 10 inches. Saginaw Control and Engineering 95 Midland Road Saginaw, Mich. 48638-5770. The controller is a Programmable logic controller/human machine interface from UNITRONICS Model No. V570-57-T20B-JN that includes an input touch screen. The input output is a UNITRONICS Model No. V200-18-E46B. Unitronics Inc. (USA Headquarters), 1 Batterymarch Park, Quincy, Mass. 02169. The solenoid valves are 4EA NITRA Model No. AVS5313-24D from AUTOMATIONDIRECT-.COM Inc. CORPORATION GEORGIA 3505 Hutchinson Street Cumming Ga. 30040. The power supply is a ALTECH Model No. PSC-9624 24V DC 4 Ampere. ALTECH Corp., 35 Royal Road, Flemington, N.J. Connections are made via ALLAN BRADLEY model No. 1492-J4 terminal blocks, Model 1492-JG4 ground block, and 22mm e-stop from Rockwell Automation, 1 Information Way, Little Rock, Ark.

As noted in FIG. 3, the method of controlling the process flow of the present invention is as follows:

Starting with No Product

A1. Press start prefill push button on the touchscreen

A2. Close the vacuum solenoid valve 272 to close the transfer pneumatic flow valve 302

A3. Open the vacuum solenoid valve 272 to open the vacuum pneumatic valve 262-vacuum pulls the product into the supply tank.

A4. Set the supply level probe system 250 level of product at full level

A5. Close the vacuum solenoid valve 272 to close the vacuum pneumatic valve 262

A6. Open the supply tank pressure transducer 242 & the supply pressure enable solenoid valve 246 to pressurize tank A7. Time delay for tanks to equalize A8. Open the transfer solenoid valve 310 to open the transfer pneumatic flow valve 302

A9. Set the supply level probe system 250 level of product at empty level

A10. Time delay for product flow

A11. Close the transfer solenoid valve 310 to close the transfer pneumatic flow valve 302

A12. Repeat steps A2-A11 until the feed level probe system 450 reaches full level setpoint A13. Repeat steps A2-A6 to fill supply tank Product feed start after prefill B1. Press start feed push button on touchscreen B2. Open the feed tank pressure transducer 442 and the feed pressure enable solenoid valve 446 to pressurize feed tank B3. When the feed level probe system 450 reaches fill level open the transfer solenoid valve 310 to open the transfer pneumatic flow valve 302 to start supply cycle steps A2-A11

B4. the feed level probe system 450 reaches full level, stop supply and fill supply tank for next supply cycle End of Run C1. Press supply stop push button on screen C2. Disable the feed level probe system 450 low level and continue feeding until feed tank is empty C3. Open the transfer solenoid valve 310 to open the transfer pneumatic flow valve 302 and empty the supply tank into the feed tank C4. Press stop feed PB on screen and set the supply tank pressure transducer 242 & the feed tank pressure transducer 442 to 0 psi C5. Press Estop to dump air pressure that remains if any Reference numerals used throughout the detailed description and the drawings correspond to the following elements:

Air Supply 10
Air line 12
Vacuum Supply 20
Vacuum line 14
Continuous flow poultry meat system 100
Supply stage 200
Gravity separation supply tank 202
Supply tank body 204
  Supply Tank top 206
    Supply Probe aperture 208
    Supply Pressure aperture 210
    Supply Vacuum aperture 212
  Supply Tank side wall 214
    Supply infeed aperture 216
  Supply Tank bottom 218
    Supply output aperture 220
  Product infeed 230
    Infeed pipe 232
    Infeed Check valve 234
Supply pressure system 240
Supply tank pressure transducer 242
Supply transducer air line 244
Supply pressure enable solenoid valve 246
Supply pressurizing line 248
Supply level probe system 250
Probe body 252
Probe rod 254
Vacuum Draw system 260
Pneumatic valve 262
Vacuum control lines 263
Vacuum valve input 264
Vacuum valve output 266
Pneumatic vacuum actuator 267
First solenoid line 268
Second solenoid line 270
Vacuum solenoid valve 272
Transfer stage 300
Transfer pneumatic flow valve 302
Transfer control lines 303
Transfer pneumatic valve actuator 304
First transfer solenoid line 306
Second transfer solenoid line 308
Transfer solenoid valve 310
Feed stage 400
Feed tank 402
Feed tank body 404
Tank top 406
  Probe aperture 408
  Pressure aperture 410
  Feed input aperture 412
Tank side wail 414
Tank bottom 418
  Feed output aperture 420
Feed pressure system 440
Feed tank pressure transducer 442
Feed transducer air line 444
Feed pressure enable solenoid valve 446
Feed pressurizing line 448
Feed level probe system 450
Probe body 452
Probe rod 454
Product discharge stage 500
Discharge line 502
Conveyor belt 504
Conveyor drive 506

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A continuous flow poultry meat apparatus using a pressurized air supply provided through an pressurized air line and a vacuum supply provided through a vacuum line, the continuous flow poultry meat apparatus comprising:
    a supply stage including a gravity separation supply tank with a supply tank body having an upper supply infeed aperture and lower supply output aperture such that the poultry meat falls toward the lower supply output aperture;
    a transfer stage including a transfer flow valve fluidly connected to the lower supply output aperture; and a feed stage including a feed tank body fluidly connected to the transfer flow valve, the feed tank body including a tank bottom defining a feed output aperture and a feed pressure system pressurizing the feed tank body to push the poultry meat out the feed output aperture.

2. The continuous flow poultry meat apparatus of claim 1, further comprising:
the supply stage further including an infeed pipe connected through an infeed check valve to the supply infeed aperture.

3. The continuous flow poultry meat apparatus of claim 1, further comprising:
the supply stage further including a supply pressure system using a supply tank pressure transducer connected via a supply transducer air line to a supply pressure enable solenoid valve which is connected via a supply pressurizing line to the gravity separation supply tank.

4. The continuous flow poultry meat apparatus of claim 1, further comprising:
the supply stage further including a supply level probe system including a probe body mounted to the gravity separation supply tank and a probe rod extends into the gravity separation supply tank.

5. The continuous flow poultry meat apparatus of claim 1, further comprising:
the supply stage further including a vacuum draw system including a pneumatic valve connected to the gravity separation supply tank, the pneumatic valve connected to a vacuum solenoid valve.

6. The continuous flow poultry meat apparatus of claim 1, further comprising:
the transfer flow valve connected by transfer control lines to a transfer pneumatic valve connected by transfer solenoid lines to a transfer solenoid valve.

7. The continuous flow poultry meat apparatus of claim 1, further comprising:
the feed tank body including a tank top defining a pressure aperture;
the feed pressure system including a feed tank pressure transducer connected by feed transducer air line to a feed pressure enable solenoid valve;
the feed pressure enable solenoid valve connected by a feed pressurizing line to the pressure aperture.

8. The continuous flow poultry meat apparatus of claim 1, further comprising:
the feed tank body including a tank top defining a probe aperture;
a feed level probe system including a probe body mounted in the probe aperture and a probe rod extending into the feed tank body.

* * * * *